(12) United States Patent
Jung et al.

(10) Patent No.: US 8,823,673 B2
(45) Date of Patent: Sep. 2, 2014

(54) DISPLAY APPARATUS AND METHOD OF DRIVING THE SAME

(71) Applicant: Samsung Display Co., Ltd., Yongin (KR)

(72) Inventors: Suk Won Jung, Goyang-si (KR);
SungHoon Yang, Seoul (KR);
Woongkwon Kim, Cheonan-si (KR);
Sang Youn Han, Seoul (KR);
Byeonghoon Cho, Seoul (KR);
Daecheol Kim, Hwaseong-si (KR);
Ki-Hun Jeong, Cheonan-si (KR);
Kyung-Sook Jeon, Yongin-si (KR);
Jung suk Bang, Guri (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/907,041

(22) Filed: May 31, 2013

(65) Prior Publication Data

US 2013/0271424 A1   Oct. 17, 2013

Related U.S. Application Data

(62) Division of application No. 12/979,964, filed on Dec. 28, 2010, now Pat. No. 8,466,892.

(30) Foreign Application Priority Data

Aug. 5, 2010   (KR) .......................... 10-2010-0075694

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01)

USPC .......................................................... 345/173

(58) Field of Classification Search
None
See application file for complete search history.

(56) References Cited

U.S. PATENT DOCUMENTS

| | | | |
|---|---|---|---|
| 2002/0196238 A1* | 12/2002 | Tsukada et al. | 345/173 |
| 2005/0110769 A1* | 5/2005 | DaCosta et al. | 345/173 |
| 2006/0201931 A1 | 9/2006 | Lee et al. | |
| 2006/0267953 A1* | 11/2006 | Peterson et al. | 345/173 |
| 2006/0279548 A1* | 12/2006 | Geaghan | 345/173 |
| 2007/0109274 A1 | 5/2007 | Reynolds | |
| 2007/0229455 A1* | 10/2007 | Martin et al. | 345/156 |
| 2008/0024459 A1* | 1/2008 | Poupyrev et al. | 345/173 |
| 2008/0042985 A1 | 2/2008 | Katsuhito et al. | |
| 2008/0122798 A1* | 5/2008 | Koshiyama et al. | 345/173 |
| 2008/0158165 A1 | 7/2008 | Geaghan et al. | |
| 2008/0246739 A1 | 10/2008 | Choi et al. | |

(Continued)

*Primary Examiner* — Amare Mengistu
*Assistant Examiner* — Antonio Xavier
(74) *Attorney, Agent, or Firm* — Cantor Colburn LLP

(57) ABSTRACT

A display apparatus includes a display panel, sensor circuits, and a detection circuit. Each sensor circuit senses at least two external signals different from each other and outputs a sensing signal. The detection circuit receives the sensing signal to detect a position to which the external signals are applied. Each sensor circuit includes sensors commonly connected to an output terminal, a scan line which receives a scan signal, a capacitor disposed between the scan line and the output terminal, charged with a first voltage in response to the scan signal, and charged with a second voltage greater than the first voltage in response to the current signal after the scan line is floated, a switching device which outputs the sensing signal in response to the second voltage, and a readout line which applies the sensing signal output from the switching device to the detection circuit.

3 Claims, 9 Drawing Sheets

(56) References Cited

U.S. PATENT DOCUMENTS

| | | |
|---|---|---|
| 2008/0259053 A1* | 10/2008 | Newton ................... 345/175 |
| 2009/0046110 A1* | 2/2009 | Sadler et al. ............. 345/660 |
| 2009/0058829 A1* | 3/2009 | Kim et al. ................ 345/173 |
| 2009/0085881 A1* | 4/2009 | Keam ....................... 345/173 |
| 2009/0122007 A1* | 5/2009 | Tsuzaki et al. ........... 345/156 |
| 2009/0225058 A1 | 9/2009 | Tateuchi et al. |
| 2010/0139990 A1* | 6/2010 | Westerman et al. ..... 178/18.03 |
| 2010/0141591 A1* | 6/2010 | Lin ........................... 345/173 |
| 2010/0149128 A1* | 6/2010 | No et al. ................... 345/174 |
| 2010/0156849 A1* | 6/2010 | Lee .......................... 345/175 |
| 2010/0214259 A1 | 8/2010 | Philipp et al. |
| 2011/0007021 A1* | 1/2011 | Bernstein et al. ......... 345/174 |
| 2011/0032198 A1* | 2/2011 | Miyazawa et al. ........ 345/173 |
| 2011/0063243 A1 | 3/2011 | Kim et al. |
| 2011/0063248 A1* | 3/2011 | Yoon ........................ 345/174 |
| 2011/0193809 A1* | 8/2011 | Walley et al. ............. 345/173 |
| 2011/0248948 A1* | 10/2011 | Griffin et al. ............. 345/174 |
| 2012/0050180 A1* | 3/2012 | King et al. ................ 345/173 |

* cited by examiner

DISPLAY APPARATUS AND METHOD OF DRIVING THE SAME

This application is a divisional of U.S. patent application Ser. No. 12/979,964, filed on Dec. 28, 2010, which claims priority to Korean Patent Application No. 2010-75694, filed on Aug. 5, 2010, and all the benefits accruing therefrom under 35 U.S.C. §119, the content of which in its entirety is herein incorporated by reference.

BACKGROUND OF THE INVENTION (1) Field of the Invention

The general inventive concept relates to a display apparatus and a method of driving the same. More particularly, the general inventive concept relates to a display apparatus including sensors disposed therein and a method of driving the display apparatus.

(2) Description of the Related Art

In general, an image display apparatus including a touch panel detects a touch position on the touch panel and carries out a predetermined operation in response to a signal generated corresponding to the touch position.

The image display apparatus including the touch panel is widely used since the image display apparatus may be used without a separate input device (e.g., keyboard and mouse) connected to the image display apparatus.

In recent, the touch panel is applied to a liquid crystal display, however optical properties (e.g., brightness and viewing angle) of the liquid crystal display are deteriorated when the touch panel is prepared as a separate input device from a liquid crystal display panel. In addition, an entire thickness of the liquid crystal display substantially increases by a thickness of the touch panel.

SUMMARY OF THE INVENTION

Embodiments of the present invention provide a display apparatus with improved accuracy in touch position detection.

Embodiments of the present invention provide a method of sensing an external signal using the display apparatus.

According to exemplary embodiments, a display apparatus includes a display panel which displays an image, a plurality of sensor circuits, and a detection circuit. The display panel includes a plurality of pixels. Each of the plurality of sensor circuits senses at least two external signals different from each other and outputs a sensing signal. The detection circuit receives the sensing signal to detect a position to which the external signals are applied. Each of the plurality of sensor circuits includes a plurality of sensors commonly connected to an output terminal, a scan line which receives a scan signal, a capacitor disposed between the scan line and the output terminal, charged with a first voltage in response to the scan signal, and charged with a second voltage greater than the first voltage in response to the current signal after the scan line is floated, a switching device which outputs the sensing signal in response to the second voltage and a readout line which applies the sensing signal output from the switching device to the detection circuit. The sensors sense the at least two external signals and outputs a current signal corresponding to the external signals, and the current signal is output through the output terminal.

In an exemplary embodiment, a level of the first voltage may be less than a level of a threshold voltage of the switching device, and a level of the second voltage may be greater than a level of the threshold voltage of the switching device.

In an exemplary embodiment, the display apparatus may further include a scan driver connected to the scan line to apply the scan signal to the scan line.

In an exemplary embodiment, the scan driver may include a shift register which outputs a base signal, an inverter circuit which inverts the base signal from the shift register and outputs the scan signal, and a switching circuit connected to an output terminal of the inverter circuit, where the scan line is floated by the switching circuit in response to a switching signal during a predetermined period.

In an exemplary embodiment, each of the plurality of sensors may include a first sensor which senses a first light having a wavelength of a visible light, and a second sensor which senses a second light having a wavelength of an infrared light.

In an exemplary embodiment, the second sensor may include a filter which transmits the first light and blocks the second light.

In an exemplary embodiment, each of the first sensor and the second sensor may include a gate electrode connected to a voltage line which supplies a first bias voltage, a source electrode connected to a voltage line which supplies a second bias voltage, and a drain electrode connected to the output terminal.

In an exemplary embodiment, the switching device may include a gate electrode connected to the scan line, a drain electrode connected to the readout line, and a source electrode connected to a voltage line which supplies a third bias voltage.

In an exemplary embodiment, the capacitor may include a first electrode electrically connected to the gate electrode of the switching device, and a second electrode electrically connected to the output terminal.

In an exemplary embodiment, the first electrode may be integrated with the gate electrode of the switching device.

In an exemplary embodiment, each of the switching device, the first sensor and the second sensor may include a semiconductor layer.

In an exemplary embodiment, the semiconductor layer may include silicon-germanium.

In an exemplary embodiment, the plurality of sensor circuits may be disposed in the display panel.

In an exemplary embodiment, the display panel may include an upper substrate and a lower substrate, and the plurality of sensor circuits may be disposed on the upper substrate.

According to another exemplary embodiment, a method of driving a display apparatus including first and second sensors, where each of the first sensor and the second sensor senses at least one of at least two external signals different from each other, includes applying a scan signal to charge a capacitor with a first voltage, charging the capacitor with a second voltage in response to a current signal corresponding to the at least two external signals sensed by at least one of the first sensor and the second sensor after applying the scan signal, wherein a level of the second voltage is greater than a level of the first voltage, outputting a sensing signal through a switching device in response to the second voltage, generating position information based on the sensing signal, wherein the position information is corresponding to a position at which the at least two external signals are sensed, and processing an event corresponding to the position information and displaying a processed result on a display panel.

In an exemplary embodiment, the method may further include lowering a voltage charged to the capacitor from the second voltage to the first voltage.

According to exemplary embodiments, the sensors which sense the different external signals are commonly connected to the switching device. Thus, the number of the switching devices may be decreased, and a circuit configuration of the sensor circuits is thereby effectively simplified. In addition, the number of the sensors arranged therein is substantially increased, and a resolution of a touch panel is substantially increased, such that the touch position is sensed with improved accuracy.

BRIEF DESCRIPTION OF THE DRAWINGS

The above and other advantages of the invention will become more apparent by describing in further detail exemplary embodiments thereof with reference to the accompanying drawings, in which.

DETAILED DESCRIPTION OF THE INVENTION

Figure 1:
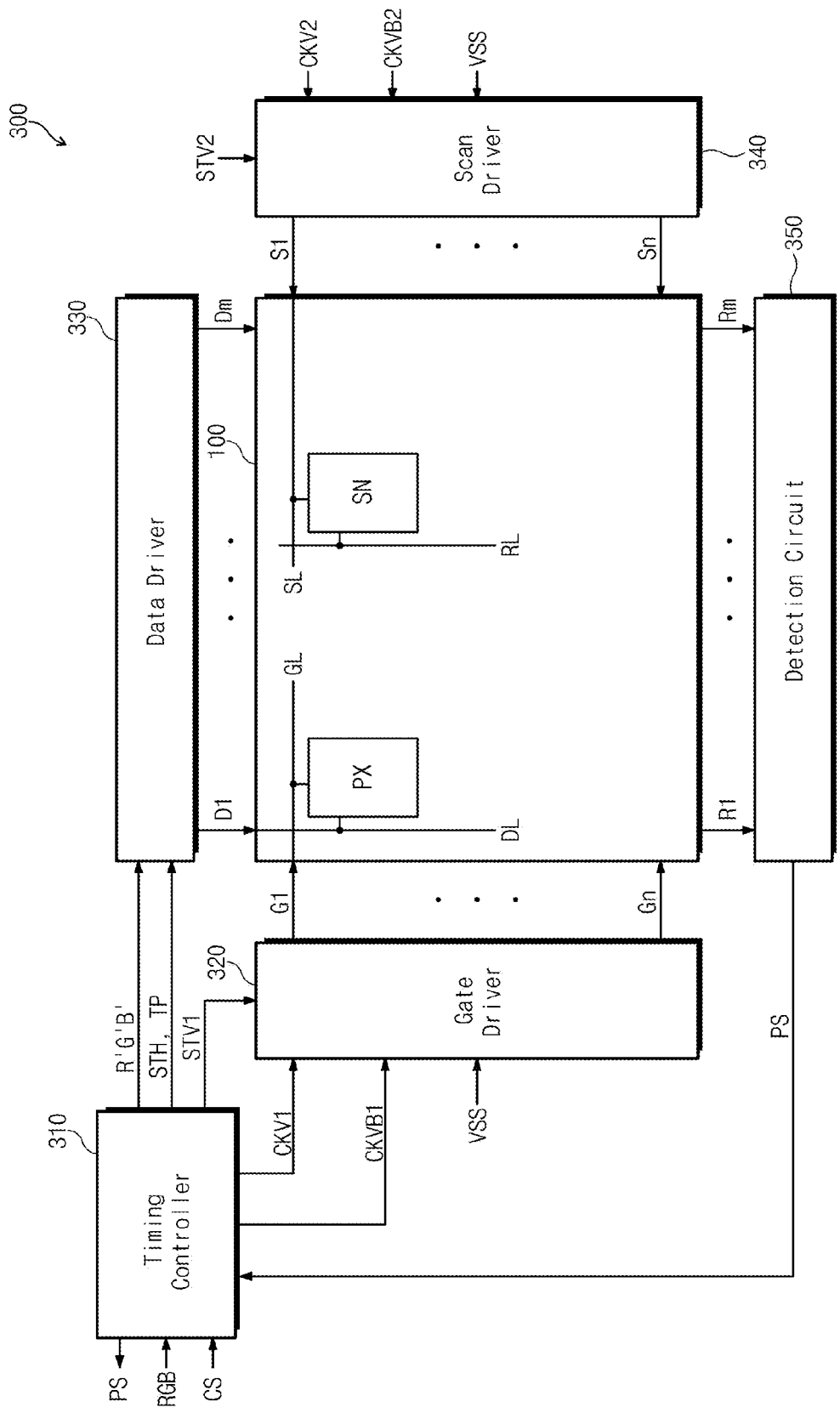
FIG. 1 is a block diagram showing an exemplary embodiment of a display apparatus according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", or "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
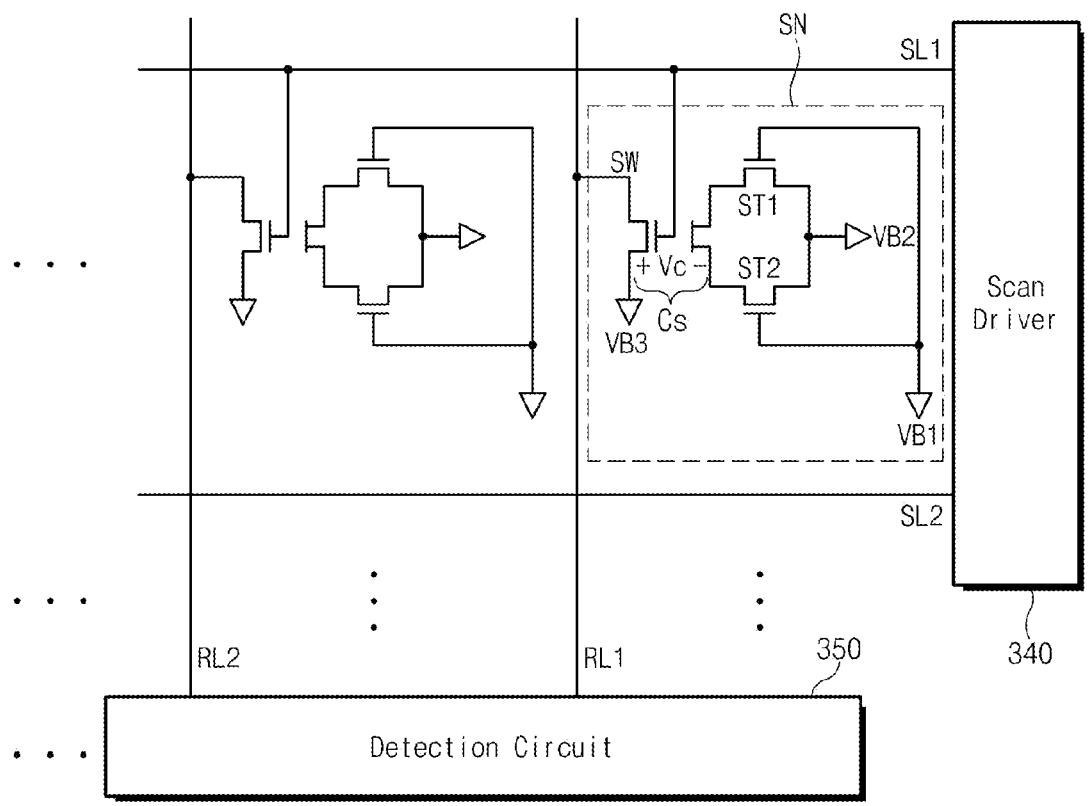
FIG. 2 is a schematic circuit diagram showing an exemplary embodiment of a sensor shown in FIG. 1.

FIG. 1 is a block diagram showing an exemplary embodiment of a display apparatus according to the present invention, and FIG. 2 is a schematic circuit diagram showing an exemplary embodiment of sensors shown in FIG. 1.

Referring to FIG. 1, a display apparatus 300 includes a display panel 100, a timing controller 310, a gate driver 320, a data driver 330, a scan driver 340 and a detection circuit 350.

The timing controller 310 receives image signals RGB and control signals CS from an external device. The timing controller 310 converts a data format of the image signals RGB into a data format corresponding to an interface between the timing controller 310 and the data driver 330, and thereby outputs converted image signals R'G'B' to the data driver 330.

In addition, the timing controller 310 applies data control signals, e.g., output start signal TP and horizontal start signal STH, to the data driver 330, and gate control signals, e.g., a vertical start signal STV1, a vertical clock signal CKV1 and a vertical clock bar signal CKVB1, to the gate driver 320.

The gate driver 320 sequentially outputs gate signals G1 to Gn in response to the gate control signals STV1, CKV1 and CKVB1 received from the timing controller 310.

The data driver 330 converts the converted image signals R'G'B' into data voltages D1 to Dm in response to the data control signals TP, STH, and POL from the timing controller 310 and applies the data voltages D1 to Dm to the display panel 100.

The display panel 100 includes a plurality of pixels PX and a plurality of sensor circuits SN. In an exemplary embodiment, the pixels PX and the sensor circuits SN may be disposed in the display panel 100. The display panel 100 includes a lower substrate, an upper substrate disposed opposite to, e.g., facing, the lower substrate and a liquid crystal layer disposed between the lower substrate and the upper substrate. In an exemplary embodiment, the sensors circuits SN may be disposed on the upper substrate.

In an exemplary embodiment, each of the pixels PX may have the same structure and function, so one pixel of the pixels PX will be described in detail, and the detailed descriptions of the other pixels of the pixels PX will be omitted or simplified.

The lower substrate includes a plurality of gate lines GL, a plurality of data lines DL crossing the gate lines GL and a plurality of pixels PX. Although not shown in FIGS. 1 and 2, each of the pixels PX may include a thin film transistor, a liquid crystal capacitor and a storage capacitor. The thin film transistor may include a gate electrode connected to a corresponding gate line of the gate lines GL, a source electrode connected to a corresponding data line of the data lines DL, and a drain electrode connected to the liquid crystal capacitor and the storage capacitor.

The gate lines GL are connected to the gate driver 320, and the data lines DL are connected to the data driver 330. The gate lines GL receive the gate signals G1 to Gn provided from the gate driver 320, and the data lines DL receive the data voltages D1 to Dm provided from the data driver 330.

Thus, the thin film transistor in each pixel PX is turned on in response to a corresponding gate signal of the gate signals G1 to Gn, which is transmitted through a corresponding gate line of the gate lines GL. The data voltage applied to the data line connected to the turned-on thin film transistor is applied to a first electrode (hereinafter, referred to as "pixel electrode") of the liquid crystal capacitor through the turned-on thin film transistor. In an exemplary embodiment, a second electrode (hereinafter, referred to as "common electrode") of the liquid crystal capacitor receives a common voltage. The common electrode is disposed on the upper substrate, and the common voltage is a direct-current voltage. Accordingly, the liquid crystal capacitor is charged with a voltage corresponding to an electric potential difference between the common voltage and the data voltage. Each of the pixels PX controls a light transmittance of the liquid crystal layer according to the voltage charged in the liquid crystal capacitor, thereby displaying desired images.

In an exemplary embodiment, the upper substrate includes a plurality of scan lines SL, a plurality of readout lines RL and the sensor circuits SN.

In an exemplary embodiment, each of the sensor circuits SN may have the same structure and function, and thus one sensor circuit will be described in detail with reference to FIG. 2. For the purpose of explanation, first and second scan lines SL1 and SL2 of the scan lines SL and first and second readout lines RL1 and RL2 are shown in FIG. 2.

Referring to FIG. 2, each sensor circuit SN may be disposed in a region divided by the first and second scan lines SL1 and SL2 and the first and second readout lines RL1 and RL2, respectively.

Each sensor circuit SN includes a first sensor ST1, a second sensor ST2, a switching device SW and a capacitor Cs. In an exemplary embodiment, each of the switching device SW and the first and second sensors ST1 and ST2 may be a transistor, and the transistor may have a semiconductor layer comprising silicon-germanium.

The switching device SW may include a gate electrode connected to the first scan line SL1, a drain electrode connected to the first readout line RL1, and a source electrode connected to a voltage line that supplies a third bias voltage VB3.

The first and second sensors ST1 and ST2 receive external signals different from each other, respectively, and output a current signal corresponding to the external signals. In an exemplary embodiment the current signal may be varied in amplitude according to the external signals.

The first sensor ST1 senses a first light having a wavelength of visible light. The first sensor ST1 includes a gate electrode connected to a voltage line that supplies a first bias voltage VB1, a source electrode connected to a voltage line that supplies a second bias voltage VB2, and a drain electrode connected to an output terminal from which the variable current signal is output. The first bias voltage VB1 may have a negative value.

In an exemplary embodiment, the second sensor ST2 senses a second light having a wavelength of infrared light. The second sensor ST2 includes a gate electrode connected to the voltage line that supplies the first bias voltage VB1, a source electrode connected to the voltage line that supplies the second bias voltage VB2, and a drain electrode connected to an output terminal from which the variable current signal is output. In an exemplary embodiment, the first sensor ST1 and the second sensor ST2 may be commonly connected to the same output terminal. The second sensor ST2 may include an infrared light filter that blocks the first light having a wavelength of visible light and transmits the second light having wavelength of infrared light.

The capacitor Cs is disposed between a corresponding scan line (e.g., the first scan line SL1) and the first and second sensors ST1 and ST2. In an exemplary embodiment, the capacitor Cs includes a first electrode electrically connected to a gate electrode of the switching device SW and a second electrode electrically connected to the output terminal of the first and second sensors ST1 and ST2.

The first electrode of the capacitor Cs is connected to the same scan line SL1 as the gate electrode of the switching device SW. In addition, as shown in FIG. 2, the first electrode of the capacitor Cs may be integrally formed with the gate electrode of the switching device SW.

The capacitor Cs receives the scan signal from the first scan line SL1 and is charged with a first voltage, and then the capacitor Cs is charged with a second voltage greater than the first voltage when the first scan line SL1 is floated after the supply of the scan signal thereto is stopped.

Since the scan signal applied through the first scan line SL1 has a voltage level less than a threshold voltage of the switching device SW, the first voltage is less than the threshold voltage of the switching device SW and the second voltage is greater than the threshold voltage of the switching device SW. Thus, the switching device SW is turned on the second voltage charged in the capacitor Cs and outputs the sensed signal through a corresponding readout line (e.g., first readout line RL1).

The scan lines SL are connected to the scan driver 340 to receive the scan signals, respectively. The scan driver 340 receives scan control signals, e.g., a start signal STV2, a first clock signal CKV2 and a second clock signal CKVB2, to output the scan signals. The scan control signals, e.g., the start signal STV2, the first clock signal CKV2 and the second clock signal CKVB2, may be a signal synchronized with corresponding gate control signals, e.g., the vertical start signal STV1, the vertical clock signal CKV1, and the vertical clock bar signal CKVB1, respectively. The configuration and operation of the scan driver 340 will be described in detail with reference to FIG. 3.

Each of the sensor circuits SN shown in FIG. 2 includes the sensors that receive the external signals different from each other and are commonly connected to one switching device. Accordingly, the number of the switching devices and the voltage lines may be decreased, thereby simplifying the circuit configuration of the sensor circuits. As a result, the number of the sensors arranged in the same region may be increased and a resolution of a touch panel may be increased, to thereby more exactly sense the touch position.

Figure 3:
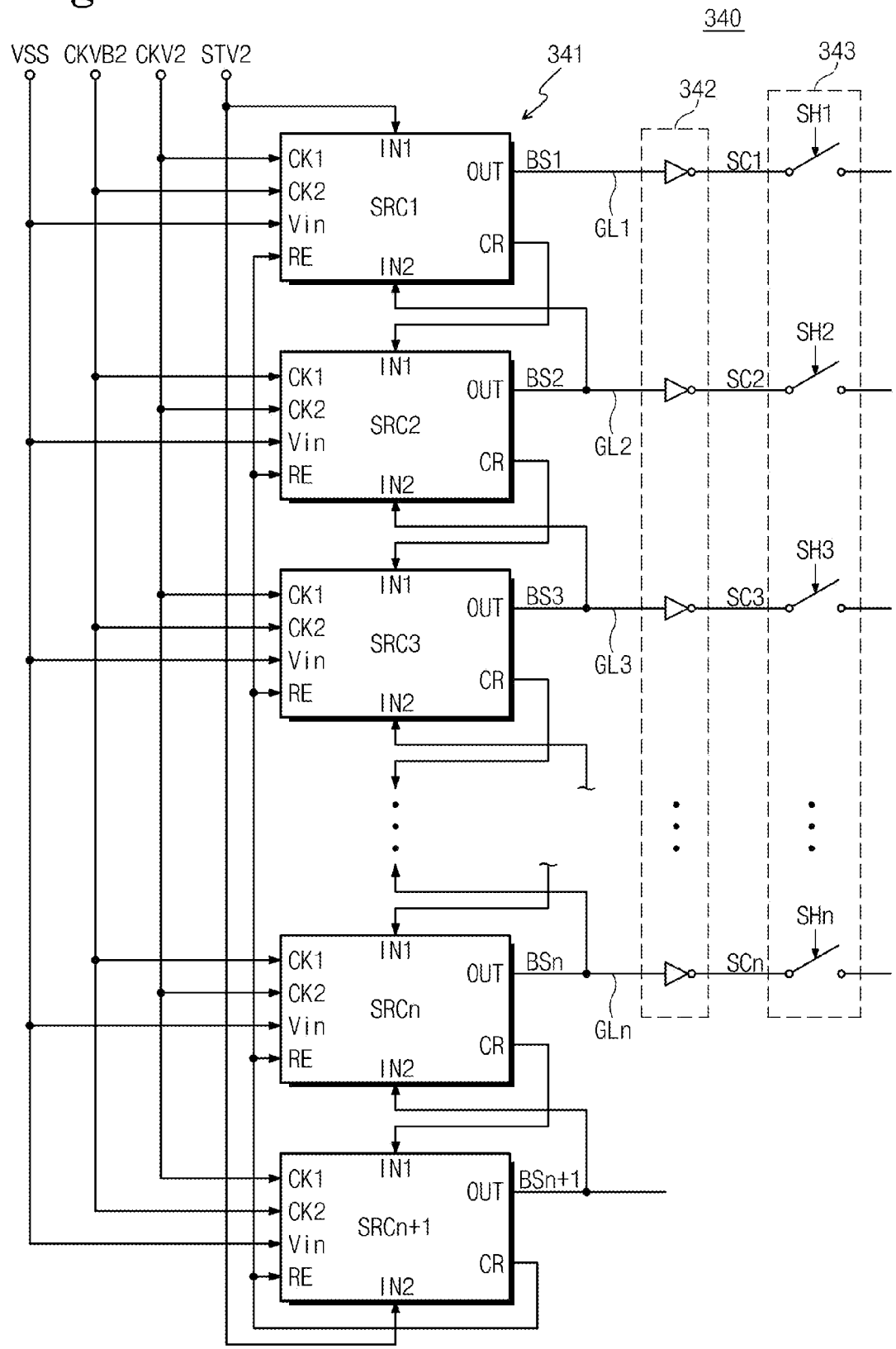
FIG. 3 is a schematic circuit diagram showing an exemplary embodiment of a scan driver according to the present invention.

FIG. 3 is a schematic circuit diagram showing an exemplary embodiment of a scan driver according to the present invention.

Referring to FIG. 3, the scan driver 340 includes a shift register 341, an inverter circuit 342 and a switching circuit 343.

The shift register 341 includes a plurality of stages, e.g., a first stage SRC1 to an (n+1)-th stage SRCn+1, connected to each other one after another. Each of the stages includes a first input terminal IN1, a first clock terminal CK1, a second clock terminal CK2, a second input terminal IN2, a voltage input terminal Vin, a reset terminal RE, an output terminal OUT and a carry terminal CR.

The first input terminal IN1 of each of the stages SRC1 to SRCn+1 is electrically connected to the carry terminal CR of a previous stage to receive a carry signal, except for the first input terminal IN1 of the first stage SRC1 that receives the start signal STV2 that starts the operation of the scan driver 340. The second input terminal IN2 of each of the stages SRC1 to SRCn+1 is electrically connected to the output terminal OUT of a subsequent stage to receive a base signal output from the subsequent stage, except for the second input terminal IN2 of the last stage, e.g., the (n+1)-th stage SRCn+1, that receives the start signal STV2.

Each odd-numbered stage SRC1, SRC3, ... , SRCn+1 of the stages SRC1 to SRCn+1 receives the first clock CKV2 through the first clock terminal CK1 thereof and the second clock CKVB2 having an opposite phase to the first clock CKV2 through the second clock terminal CK2 thereof. Each even-numbered stage SRC2, ... , SRCn of the stages SRC1 to SRCn+1 receives the second clock CKVB2 through the first clock terminal CK1 thereof and the second clock CKV2 through the second clock terminal CK2 thereof.

The voltage input terminal Vin of each of the stages SRC1 to SRCn+1 receives a ground voltage or a gate off voltage VSS. In addition, the carry terminal CR of each of the stages SRC1 to SRCn except for the last stage, e.g., the (n+1)-th stage SRCn+1, of the stages SRC1 to SRCn+1 is connected to the first input terminal IN1 of the subsequent stage and the carry terminal CR of the last stage SRCn+1 is electrically connected to the reset terminal RE of each of the stages SRC1 to SRCn.

In an exemplary embodiment, the inverter circuit 342 includes a plurality of inverters.

The output terminal OUT of each of the stages SRC1 to SRCn is electrically connected to a corresponding inverter of the inverter circuit 342. In an exemplary embodiment, the output terminal of each of the stages SRC1 to SRCn corresponds to a different inverter of the inverter circuit 342. The inverter circuit 342 is connected to the output terminal OUT of the stages SRC1 to SRCn of the shift register 341, and the inverter circuit 342 inverts base signals, e.g., a first base signal BS1 to an n-th base signal BSn, output from the stages SRC1 to SRCn to output scan signals, e.g., a first scan signal SC1 to an n-th scan signal SCn, respectively. In an exemplary embodiment, a voltage level of each of the scan signals SC1 to SCn may be less than a level of the threshold voltage of the switching device SW to effectively prevent the switching device SW from being turned on by the scan signals SC1 to SCn.

The switching circuit 343 is connected to an output terminal of the inverter circuit 342 and floats the scan lines SL1 to SLn in response to the switching signals SH1 to SHn. In an exemplary embodiment, the switching signals SH1 to SHn are sequentially applied to the scan lines SL1 to SLn, and the scan lines SL1 to SLn are thereby sequentially floated. In an exemplary embodiment, the switching signals SH1 to SHn may be synchronized with the base signals BS1 to BSn. In an exemplary embodiment, the switching signals SH1 to SHn may be the same as the base signals BS1 to BSn.

Referring again to FIGS. 1 and 2, the readout lines RL is connected to the detection circuit 350 to apply the sensing signal from the sensor circuits SN to the detection circuit 350. When the switching device SW is turned on in response to the second voltage, the sensor circuit SN provides the sensing signal corresponding to the intensity of the external signals to the first readout line RL1 through the turned-on switching device SW.

The detection circuit 350 receives the sensing signal and detects the position at which the external signals are sensed. In an exemplary embodiment, the detection circuit 350 may generate position information PS representing a position touched by user's finger as two-dimensional coordinate value.

The detection circuit 350 applies the position information PS to a processing device (not shown) through the timing controller 310. The processing device performs an operation corresponding to component displayed at the position indicated by the position information PS, and then the processing device provides image signals RGB and control signals CS based on an operation result to the timing controller 310. The display apparatus 300 displays the operation result based on the image signal RGB and the control signals CS.

Figure 4:
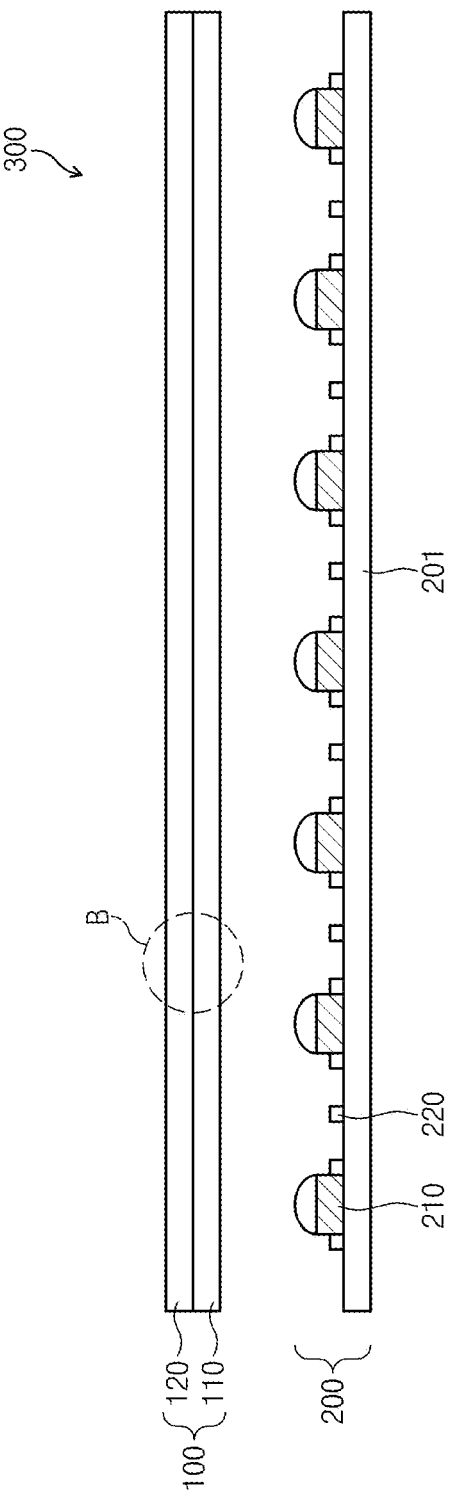
FIG. 4 is a cross-sectional view of an exemplary embodiment of a display apparatus according to the present invention.
Figure 5:
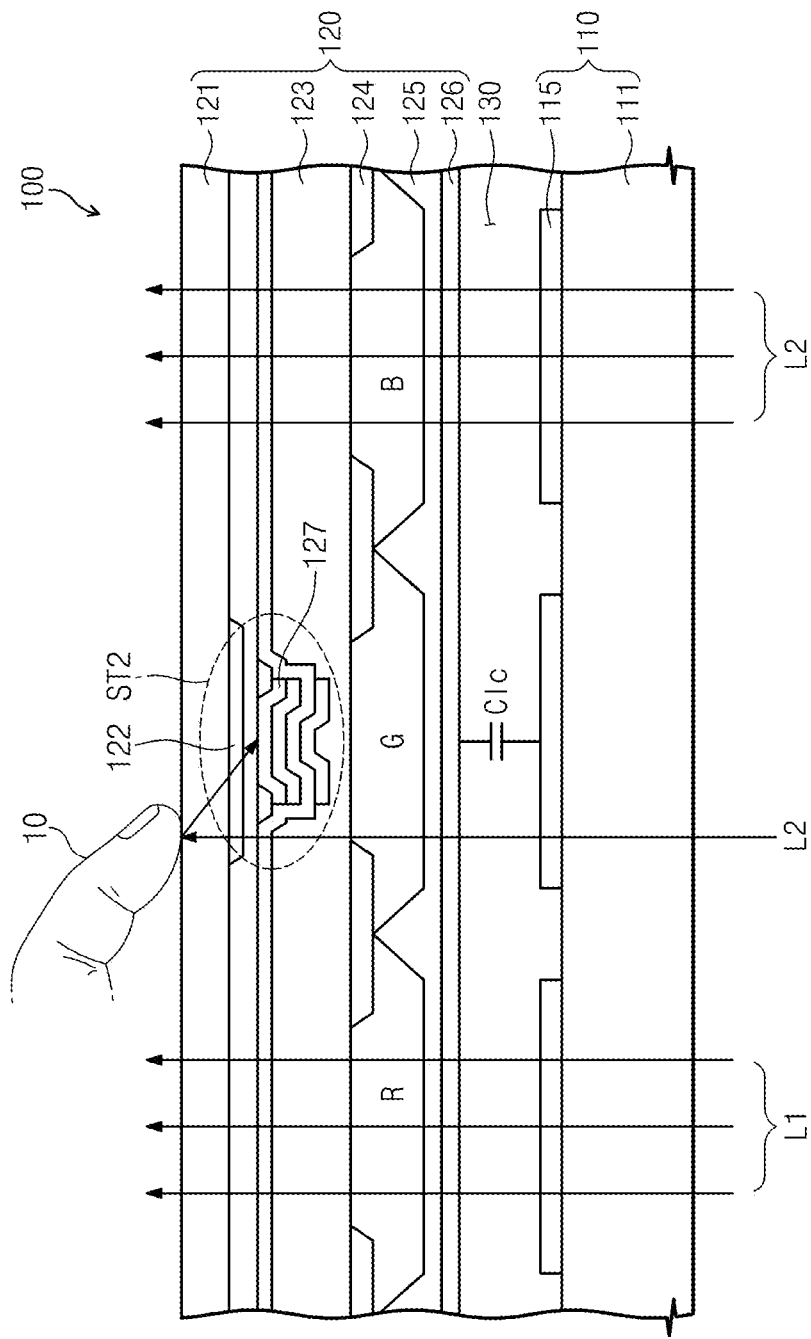
FIG. 5 is an enlarged view of portion "B" in FIG. 4.

FIG. 4 is a cross-sectional view of an exemplary embodiment of a display apparatus according to the present invention, and FIG. 5 is an enlarged view of portion "B" in FIG. 4.

Referring to FIGS. 4 and 5, a display apparatus 300 includes a display panel 100 and a backlight unit 200 disposed under the display panel 100.

Referring to FIG. 5, the display panel 100 includes a lower substrate 110, an upper substrate 120 disposed opposite to, e.g., facing, the lower substrate 110, and a liquid crystal layer 130 disposed between the lower substrate 110 and the upper substrate 120.

The lower substrate 110 includes a first base substrate 110 and a plurality of pixels PX (refer to FIG. 1) disposed on the first base substrate 111. Each pixel PX may include a pixel electrode 115 and a thin film transistor that drives the pixel electrode 115.

The upper substrate 120 includes a second base substrate 121, disposed opposite to, e.g., facing, the first base substrate 111, and a plurality of sensor circuits SN (refer to FIG. 1) disposed on the second base substrate 121. Each of the sensor circuits SN includes the first and second sensors ST1 and ST2 (refer to FIG. 2), and each of the sensors ST1 and ST2 may be a silicon-germanium (SiGe) transistor and disposed on the second base substrate 121. For the purpose of explanation, only the second sensor ST2 is shown in FIG. 5. The second sensor ST2 may further include a filter 122 disposed between a semiconductor layer 127 and the second base substrate 121 to transmit the second light L2 and to block the first light L1. The filter 122 may include the silicon-germanium (SiGe) as the semiconductor layer 127.

In an exemplary embodiment, the upper substrate 120 further includes an insulating layer 123 that covers the sensor circuits SN, and red, green and blue color pixels R, G and B, each facing a corresponding pixel electrode 115. A black matrix 124 is disposed between the red, green and blue color pixels R, G and B and the red, green and blue R, G and B are covered by an organic insulating layer 125. The upper substrate 120 further includes a common electrode 126 disposed on the organic insulating layer 125.

The pixel electrode 115, the common electrode 126 and the liquid crystal layer 130 may form a liquid crystal capacitor Clc.

In an exemplary embodiment, as shown in FIG. 5, the red, green and blue color pixels R, G and B may be disposed on the upper substrate 120. In an alternative exemplary embodiment, the red, green and blue color pixels R, G and B may be disposed on the lower substrate 110.

Referring to FIG. 4, the backlight unit 200 includes a circuit substrate 201 disposed at lower portion of the display panel 100, a plurality of first light sources 210 disposed on the circuit substrate 201 to emit a first light L1 having a wavelength of visible light, and a plurality of second light sources 220 disposed on the circuit substrate 201 to emit a second light L2 having a wavelength of infrared light.

The first and second light sources 210 and 220 may be alternately arranged along a direction, e.g., a longitudinal direction of the circuit substrate, on the circuit substrate 201. In an exemplary embodiment, as shown in FIG. 4, each of the second light sources 220 may be disposed between two first light sources 210 disposed adjacent to each other. In an exemplary embodiment, each of the first and second light sources 210 and 220 may be a light emitting diode.

Referring to FIG. 5, the first light L1 emitted from the first light sources 210 is incident on a surface of the display panel 100, and then transmitted through the liquid crystal layer 130. A light transmittance of the liquid crystal layer 130 is controlled by an electric field generated between the pixel electrode 115 and the common electrode 124. That is, the display panel 100 may control the light transmittance of the first light L1 using the liquid crystal layer 130, thereby displaying images having desired gray-scale.

In an exemplary embodiment, the second light L2 emitted from the second light sources 220 is incident on the surface of the display panel 100 and transmitted through the display panel 100. In an exemplary embodiment, the second light L2 transmitting through the display panel 100 is not perceived by human eyes, and an influence on user's perception by the second light L2 is thereby effectively prevented.

Although not shown in FIG. 5, a portion of the second light L2 emitted from the second light sources 220 may be reflected by a plurality of layers in the display panel 100, such as the pixel electrode 115, the liquid crystal layer 130, the color pixels R, G and B, for example, and a non-reflected portion of the second light L2 may be transmitted through the display panel 100.

The first light L1 and the second light L2, which are passing through the display panel 100, may be transmitted toward an outside of the display panel 100, and the first and second lights L1 and L2 passing through the display panel 100 may be reflected by an object 10, e.g., the human finger when the object 10, e.g., the human finger, is disposed on the display panel 100. The first light L1 reflected by the object 10 on the display panel 100 may be sensed by the first sensor ST1 (FIG. 2) and the second light L2 reflected by the object 10 on the display panel 100 may be sensed by the second sensor ST2. However, the first light L1 may be blocked by the liquid crystal layer 130 in an area in which a black gray-scale is displayed, and only the second light L2 may be sensed by the second sensor ST2. In other words, the display panel includes the sensors that sense the lights having wavelengths different from each other to improve sensor accuracy.

The second light L2 reflected by the object 10, e.g., a human finger, may be sensed by the second sensor ST2 disposed inside the display panel 100. The reflected second light L2 is incident on the semiconductor layer 127 of the second sensor ST2 after passing through the filter 122 and a photo-current corresponding to the light amount of the reflected second light L2 is output from the second sensor ST2.

In an exemplary embodiment, as show in FIG. 5, the second sensor ST2 is disposed in the upper substrate 120. In an alternative exemplary embodiment, the sensors including the first and second sensors ST1 and ST2 may be disposed in the lower substrate 110.

In an exemplary embodiment, the sensors are arranged in the upper substrate 120, and the sensors may be disposed relatively closed to the object than another exemplary embodiment where the sensors are arranged in the lower substrate 110. Thus, the sensitivity of the first and second sensors ST1 and ST2 and the accuracy of touch position detection may be substantially improved. In an exemplary embodiment, the first and second sensors ST1 and ST2 are arranged in an area corresponding to the black matrix 124, and an aperture ratio of the display panel 100 is thereby substantially improved.

Hereinafter, a process of sensing the external signals by using the sensor circuits SN will be described in detail. Since the sensor circuits SN have the same circuit configuration and function, one sensor circuit SN will be described with reference to FIGS. 6A to 6C as a representative example. For the convenience of explanation, the first scan line SL1 and the first readout line RL1, which are corresponding to the one sensor circuit SN, have been shown in FIGS. 6A to 6C.

Figure 6A:
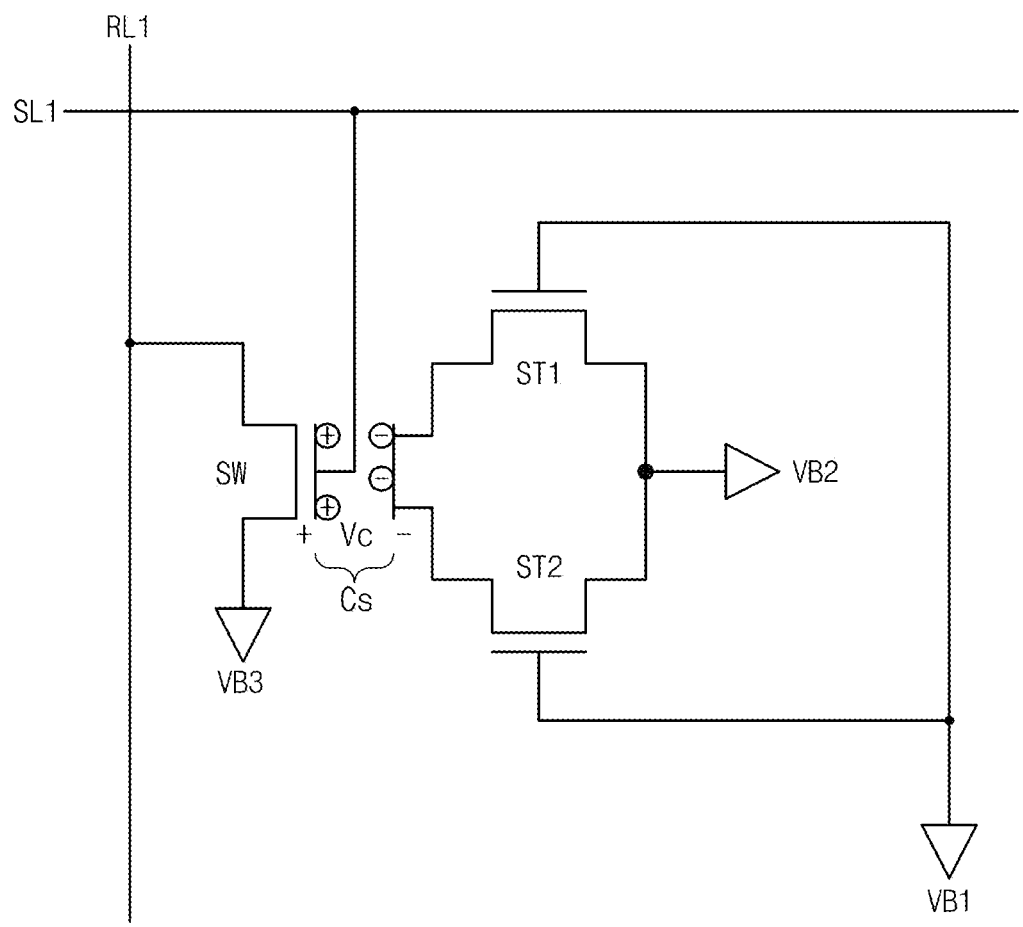
FIGS. 6A to 6C are schematic circuit diagrams illustrating a process of sensing external signals by an exemplary embodiment of the sensor.
Figure 6B:
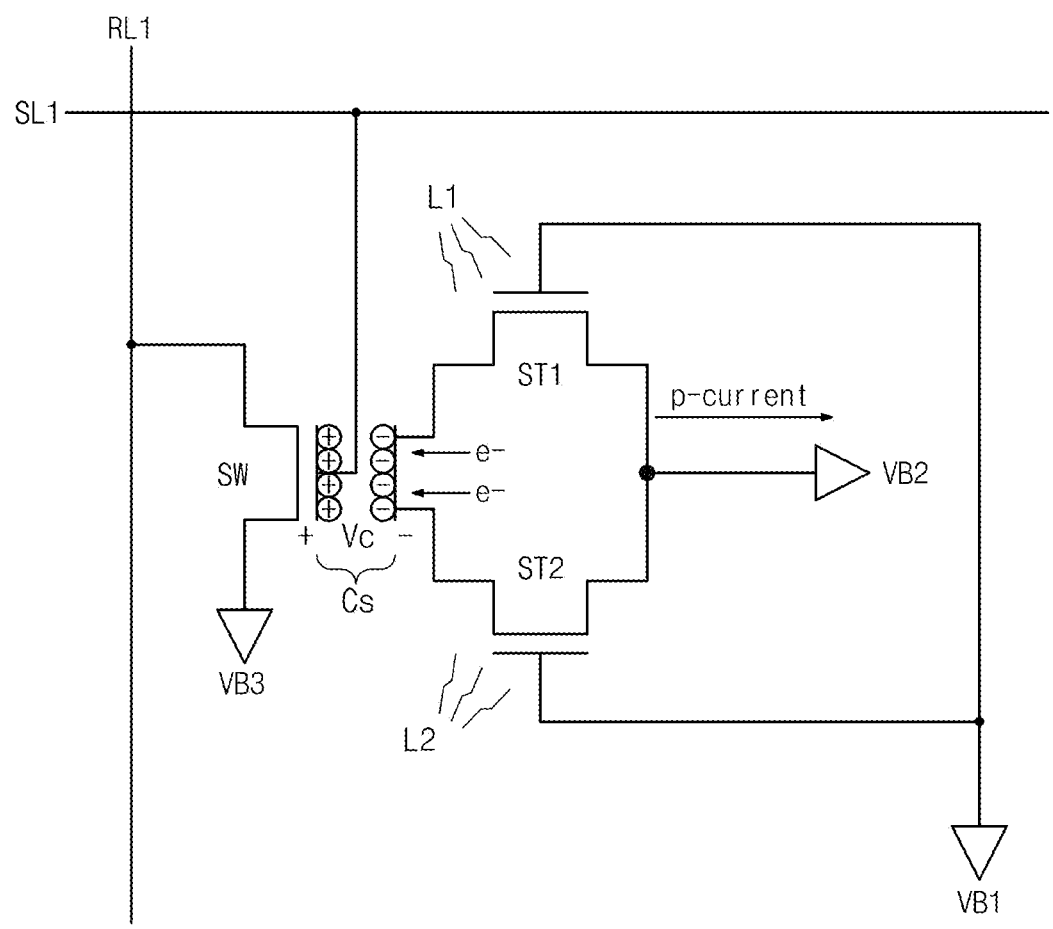
Figure 6C:
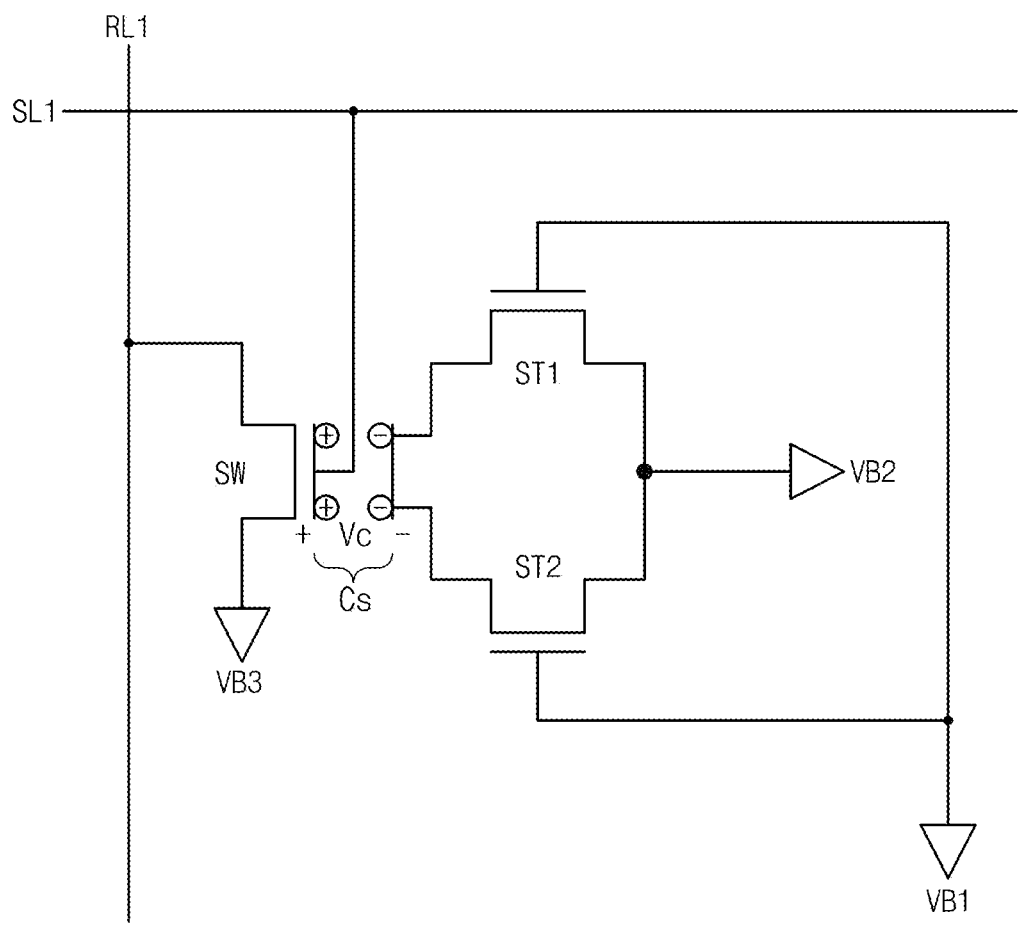
Figure 7:
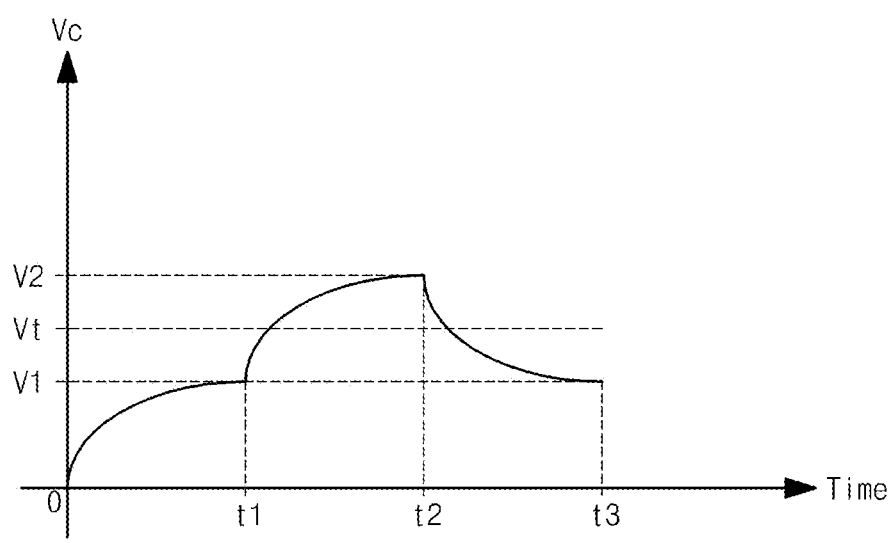
FIG. 7 is a graph showing changes in the voltage charged in a capacitor of the sensor.

FIGS. 6A to 6C are schematic circuit diagrams illustrating a process of sensing external signals by an exemplary embodiment of the sensor, and FIG. 7 is a graph showing changes in the voltage charged in the capacitor of the sensor.

FIG. 6A shows an operation of the sensor circuit when the scan signal is applied thereto and the operation of the sensor circuit corresponds to a time period from "0" to "t1" of FIG. 7.

Referring to FIGS. 6A and 7, the capacitor Cs receives the first scan signal SC1 applied through the first scan line SL1 and is charged with a first voltage V1. As described above, the first scan signal SC1 applied through the first scan line SL1 has a voltage level less than a level of a threshold voltage of the switching device SW, the first voltage V1 is also less than the threshold voltage Vt of the switching device SW, and the switching device SW is thereby in a turned-off state.

FIG. 6B shows an operation of the sensor circuit when the external signals are sensed after the scan line is floated and the operation of the sensor circuit corresponds to a time period from "t1" to "t2" of FIG. 7.

Referring to FIGS. 6B and 7, when the first scan line SL1 is floated after the transmission of the first scan signal SC1 is stopped, the capacitor Cs substantially maintains the first voltage V1 charged thereto. Then, when the first light L1 reflected by the object, e.g., human finger, is transmitted to the first sensor ST1, the first sensor ST1 outputs the current signal corresponding to the first light incident thereon. In an exemplary embodiment, the current signal output from the first sensor ST1 may be varied according to the light amount of the incident first light L1. Similarly, when the second light L2 reflected by the object, e.g., the human finger, is transmitted to the second sensor ST2, the second sensor ST2 output the current signal corresponding to the second light incident thereon. In an exemplary embodiment the current signal output from the second sensor ST2 may be varied according to the light amount of the incident second light L2. In an exemplary embodiment, when the reflected first light L1 is transmitted to the first sensor ST1 and the reflected second light L2 is transmitted to the second sensor ST2, the first and second sensors ST1 and ST2 output the current signal (p-current) corresponding to the light amount of the first and second lights L1 and L2, reflected and incident thereon.

The voltage charged to the capacitor Cs is increased by the current signal (p-current). Accordingly, the capacitor Cs may be charged with a second voltage V2 greater than the first voltage V1.

As described above, the second voltage V2 is greater than the threshold voltage Vt of the switching device SW, and the first electrode of the capacitor Cs is electrically connected to the switching device SW. Thus, the switching device SW is turned on by the second voltage V2 and the sensing signal is output through the first readout line RL1. Although a direct current voltage is applied to a source electrode of the switching device SW, the level of the sensing signal in a linear region of a transistor, e.g., the switching device SW, is substantially in proportion to the threshold voltage.

The sensing signal output through the first readout line RL1 is applied to the detection circuit 350 shown in FIG. 1, and the detection circuit 350 detects the position at which the external signals is sensed. The detection circuit 350 generates the position information PS corresponding to the touch position and provides the touch information PS to the processing device through the timing controller 310. The processing device processes an event corresponding to the position information PS and newly provides image signals RGB and control signals Cs to the timing controller 310. The timing controller 310 provides the display panel 100 with the image signals RGB and the control signals Cs from the processing device based on the processed result, and the display panel 100 displays the result corresponding to the position touched by the user in response to the image signals RGB and the control signals Cs.

FIG. 6C shows an operation of the sensor circuit when the scan signal is applied again to the scan line after the scan line is floated.

Referring to FIGS. 6C and 7, the capacitor Cs is charged with the first voltage V1 by the first scan signal SC1 applied through the first scan line SL1 as shown in FIG. 6A. That is, the voltage charged to the capacitor Cs is lowered to the first voltage V1 from the second voltage V2, such that the switching device SW is turned off.

According to exemplary embodiments of the invention as described the above, the switching device is turned on by the light incident to a plurality of sensors circuits and operates in an active area of the transistor. Accordingly, the level of the sensing signal output from the switching device becomes substantially high, and the range of the sensing signal output from the sensor circuits is substantially wide, such that the sensing sensitivity of the sensor circuit is substantially improved.

While the present invention has been particularly shown and described with reference to exemplary embodiments thereof, it will be understood by those of ordinary skill in the art that the present invention should not be limited to these exemplary embodiments but various changes and modifications in form and details may be made therein within the spirit or scope of the present invention as hereinafter claimed.

What is claimed is:

1. A method of driving a display apparatus comprising a first sensor and a second sensor commonly connected to an output terminal, wherein each of the first sensor and the second sensor senses at least one of at least two external signals different from each other and outputs a sensing signal through the output terminal, the method comprising:
    applying a scan signal to charge a capacitor with a first voltage;
    charging the capacitor with a second voltage in response to a current signal corresponding to the at least two external signals sensed by at least one of the first sensor and the second sensor commonly connected to the output terminal after applying the scan signal, wherein a level of the second voltage is greater than a level of the first voltage;
    outputting the sensing signal through a switching device and the output terminal in response to the second voltage;
    generating position information based on the sensing signal, wherein the position information is corresponding to a position at which the at least two external signals are sensed; and
    processing an event corresponding to the position information and displaying a processed result on a display panel.

2. The method of claim 1, wherein
    a level of the first voltage is less than a level of a threshold voltage of the switching device, and
    a level of the second voltage is substantially equal to or greater than a level of the threshold voltage of the switching device.

3. The method of claim 1, further comprising lowering a voltage charged to the capacitor from the second voltage to the first voltage.

* * * * *